(12) United States Patent
Ito et al.

(10) Patent No.: US 6,927,950 B2
(45) Date of Patent: Aug. 9, 2005

(54) THIN-FILM MAGNETIC HEAD AND METHOD OF MANUFACTURING SAME, HEAD GIMBAL ASSEMBLY, AND HARD DISK DRIVE

(75) Inventors: Noriyuki Ito, Tokyo (JP); Kosuke Tanaka, Tokyo (JP); Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 391 days.

(21) Appl. No.: 10/193,316

(22) Filed: Jul. 12, 2002

(65) Prior Publication Data

US 2003/0043514 A1 Mar. 6, 2003

(30) Foreign Application Priority Data

Aug. 24, 2001 (JP) ........................................ 2001-253814

(51) Int. Cl.[7] ................................................ G11B 5/39
(52) U.S. Cl. ...................................................... 360/322
(58) Field of Search ................................. 360/322, 313

(56) References Cited

U.S. PATENT DOCUMENTS 5,491,600 A * 2/1996 Chen et al. ................. 360/322

2003/0146186 A1 * 8/2003 Kanakubo et al. ............ 216/20

FOREIGN PATENT DOCUMENTS

| EP | 0 590 905 A2 | 4/1994 | |
|---|---|---|---|
| JP | 52054103 A * | 5/1977 | ........... H01R/39/04 |
| JP | A 6-180825 | 6/1994 | |
| JP | 07045657 A * | 2/1995 | ........... H01L/21/60 |
| JP | 09-138915 | 5/1997 | |

* cited by examiner

*Primary Examiner*—William J Klimowicz
(74) *Attorney, Agent, or Firm*—Oliff & Berridge, PLC

(57) ABSTRACT

A read head comprises an MR element, two bias field applying layers, and two conductive layers. The two bias field applying layers are adjacent to both side portions of the MR element, and apply a bias magnetic field to the MR element along the longitudinal direction. The two conductive layers feed a sense current to the MR element, each of the conductive layers being disposed to be adjacent to one of surfaces of each of the bias field applying layers and to overlap one of surfaces of the MR element. The conductive layers are each made of a gold alloy having a resistivity of less than 22 $\mu\Omega$·cm and a hardness as high as or higher than the hardness of a material used for making the bias field applying layers.

10 Claims, 10 Drawing Sheets

THIN-FILM MAGNETIC HEAD AND METHOD OF MANUFACTURING SAME, HEAD GIMBAL ASSEMBLY, AND HARD DISK DRIVE

BACKGROUND OF THE INVENTION

1. Field of the Invention

The present invention relates to a thin-film magnetic head that incorporates a magnetoresistive element for reading a magnetic signal and a method of manufacturing such a thin-film magnetic head, a head gimbal assembly and a hard disk drive incorporating the thin-film magnetic head.

2. Description of the Related Art

Performance improvements in thin-film magnetic heads have been sought as a real recording density of hard disk drives has increased. Such thin-film magnetic heads include composite thin-film magnetic heads that have been widely used. A composite head is made of a layered structure including a read (reproducing) head having a magnetoresistive element (that may be hereinafter called an MR element) for reading and a write (recording) head having an induction-type electromagnetic transducer for writing, the read head and the write head being stacked on a substrate.

MR elements include: an AMR element that utilizes the anisotropic magnetoresistive effect; a GMR element that utilizes the giant magnetoresistive effect; and a TMR element that utilizes the tunnel magnetoresistive effect.

Read heads that exhibit a high sensitivity and a high output are required. Read heads that meet these requirements are GMR heads incorporating spin-valve GMR elements. Such GMR heads have been mass-produced.

In general, a spin-valve GMR element incorporates: a nonmagnetic layer having two surfaces that face toward opposite directions; a first ferromagnetic layer that is located adjacent to one of the surfaces of the nonmagnetic layer; a second ferromagnetic layer that is located adjacent to the other of the surfaces of the nonmagnetic layer; and an antiferromagnetic layer that is located adjacent to one of surfaces of the second ferromagnetic layer that is farther from the nonmagnetic layer. The first ferromagnetic layer is a layer in which the direction of magnetization varies in response to a signal magnetic field, and is called a free layer. The second ferromagnetic layer is a layer in which the direction of magnetization is fixed by the magnetic field produced from the antiferromagnetic layer, and is called a pinned layer.

Another characteristic required for read heads is a small Barkhausen noise. Barkhausen noise results from transition of a domain wall of a magnetic domain of an MR element. If Barkhausen noise occurs, an abrupt variation in output results, which induces a reduction in signal-to-noise ratio (hereinafter called S/N ratio) and an increase in error rate.

To reduce Barkhausen noise, a bias magnetic field in the longitudinal direction (that may be hereinafter called a longitudinal bias field) is applied to the MR element. To apply the longitudinal bias field to the MR element, bias field applying layers may be provided on both sides of the MR element, for example. Each of the bias field applying layers is made of a hard magnetic layer or a laminate of a ferromagnetic layer and an antiferromagnetic layer, for example.

In a read head in which bias field applying layers are provided on both sides of the MR element, two conductive layers for feeding a current used for magnetic signal detection (that may be hereinafter called a sense current) to the MR element are located to touch the bias field applying layers.

It is known that, when the bias field applying layers are located on both sides of the MR element, regions that may be hereinafter called dead regions are created near ends of the MR element that are adjacent to the bias field applying layers. In these regions the magnetic field produced from the bias field applying layers fixes the direction of magnetization, and sensing of a signal magnetic field is thereby prevented.

Consequently, if the conductive layers are located so as not to overlap the MR element, a sense current passes through the dead regions. The output of the read head is thereby reduced.

To solve this problem, the conductive layers are located to overlap the MR element.

It is possible to reduce Barkhausen noise while a reduction in output of the read head is prevented, if the read head has a structure in which the bias field applying layers are located on both sides of the MR element, and the conductive layers overlap the MR element, as described above. Such a structure is hereinafter called an overlapping conductive layer structure.

As is described in Published Unexamined Japanese Patent Application (KOKAI) Heisei 6-180825 (1994), in order to increase an S/N ratio of a read head, it is preferable to lower the resistance of the entire read head including the MR element and the conductive layers.

Methods for lowering the resistance of the conductive layers include a method that increases a cross-sectional area of the conductive layers by increasing the thickness of the conductive layers, and a method that uses a material having a small resistivity to make the conductive layers. However, increasing the thickness of the conductive layers has a process limitation. Hence, in order to achieve a read head with satisfactory characteristics, it is necessary to use a material having a small resistivity to make the conductive layers.

Generally, the conductive layers are made of a layer of gold (Au), which is a low resistance material, or a laminate of an Au layer and another metal layer. Alternatively, the conductive layers may be made of a low resistance material other than Au. For example, the conductive layers may be made of a laminate of a TiW layer and a Ta layer, or of a Cu layer.

A thin-film magnetic head has a medium facing surface that faces toward a recording medium. An end of each of the MR element and the conductive layers is exposed in the medium facing surface. The medium facing surface is subjected to lapping during the fabrication process of the thin-film magnetic head.

Au, which is used as the material for the conductive layers, has an excellent resistance to corrosion but has a low hardness. For this reason, when the conductive layers are made of an Au layer, or a laminate of an Au layer and another metal layer, there are two problems as follows. A first problem is that, during lapping of the medium facing surface, the conductive layers extend in the medium facing surface and adhere to the MR element. This causes a resistance value of the MR element to change, which results in variations in the characteristics of the read head. A second problem is that lapping of the medium facing surface causes the conductive layers to be abraded more than the other layers, which results in a difference in level between each of the conductive layers and the other layers in the medium facing surface, with the end of each of the conductive layers recessed from the ends of the other layers in the medium facing surface. When the difference in level is great, even if the medium facing surface is covered with a protection film of diamond-like carbon (DLC) or the like, a gap is produced between the protection film and the ends of the conductive layers. As a result, corrosion may occur at the gap portion and spread toward the MR element.

On the other hand, conductive layers made of a laminate of a TiW layer and a Ta layer have greater resistivity compared with the conductive layers made of an Au layer. Conductive layers made of a Cu layer have smaller resistivity compared with the conductive layers made of an Au layer, but they are vulnerable to oxidation and therefore have poorer resistance to corrosion.

Published Unexamined Japanese Patent Application (KOKAI) Heisei 6-180825 (1994) discloses AuNi as an example of materials for the conductive layers. However, this publication fails to specify preferable resistivity and preferable hardness of AuNi.

OBJECT AND SUMMARY OF THE INVENTION

It is an object of the invention to provide a thin-film magnetic head and a method of manufacturing same, a head gimbal assembly and a hard disk drive, for achieving satisfactory magnetic signal reading characteristics by preventing conductive layers, which are used for feeding a current for magnetic signal detection to a magnetoresistive element, from being damaged during processing of a medium facing surface, while sufficiently lowering the resistance of the conductive layers.

A first thin-film magnetic head of the invention comprises: a medium facing surface that faces toward a recording medium; a magnetoresistive element having two surfaces that face toward opposite directions, two side portions, and an end located in the medium facing surface; two bias field applying layers that are adjacent to the side portions of the magnetoresistive element and apply a bias magnetic field to the magnetoresistive element; and two conductive layers that feed a current used for magnetic signal detection to the magnetoresistive element, each of the conductive layers being adjacent to one of surfaces of each of the bias field applying layers and having an end located in the medium facing surface. The conductive layers are each made of a gold alloy having a resistivity of less than 22 $\mu\Omega\cdot$cm and a hardness as high as or higher than a hardness of a material used for making the bias field applying layers.

In this patent application, the gold alloy means an alloy composed of gold and one or more metal elements other than gold, in which the gold content is 50 atomic % or more.

A first method of the invention is provided for manufacturing a thin-film magnetic head comprising: a medium facing surface that faces toward a recording medium; a magnetoresistive element having two surfaces that face toward opposite directions, two side portions, and an end located in the medium facing surface; two bias field applying layers that are adjacent to the side portions of the magnetoresistive element and apply a bias magnetic field to the magnetoresistive element; and two conductive layers that feed a current used for magnetic signal detection to the magnetoresistive element, each of the conductive layers being adjacent to one of surfaces of each of the bias field applying layers and having an end located in the medium facing surface. The method comprises the steps of: forming the magnetoresistive element; forming the two bias field applying layers; and forming the two conductive layers of a gold alloy having a resistivity of less than 22 $\mu\Omega\cdot$cm and a hardness as high as or higher than a hardness of a material used for making the bias field applying layers.

According to the first thin-film magnetic head or the first method, the conductive layers are each made of a gold alloy having a resistivity of less than 22 $\mu\Omega\cdot$cm and a hardness as high as or higher than a hardness of a material used for making the bias field applying layers. Hence, the resistivity of each of the conductive layers is smaller than the resistivity of a conductive layer made of a laminate of a TiW layer and a Ta layer. In addition, the hardness of the conductive layers is as high as or higher than the hardness of the bias field applying layers, which prevents the conductive layers from being damaged during processing of the medium facing surface.

In the first thin-film magnetic head or the first method, each of the two conductive layers may be located to overlap one of the surfaces of the magnetoresistive element. In this case, each of the conductive layers may have a sheet resistivity equal to or less than one-eighth of a sheet resistivity of the magnetoresistive element. The sheet resistivity of each of the conductive layers may be 2 $\Omega$/square or less.

In the first thin-film magnetic head or the first method, the gold alloy may contain one of nickel and copper as an additive to gold.

A second thin-film magnetic head of the invention comprises: a medium facing surface that faces toward a recording medium; a magnetoresistive element having an end located in the medium facing surface; and two conductive layers that feed a current used for magnetic signal detection to the magnetoresistive element, each of the conductive layers having an end located in the medium facing surface. The conductive layers are each made of a gold alloy having a resistivity of less than 22 $\mu\Omega\cdot$cm and a hardness higher than that of gold.

A second method of the invention is provided for manufacturing a thin-film magnetic head comprising: a medium facing surface that faces toward a recording medium; a magnetoresistive element having an end located in the medium facing surface; and two conductive layers that feed a current used for magnetic signal detection to the magnetoresistive element, each of the conductive layers having an end located in the medium facing surface. The method comprising the steps of: forming the magnetoresistive element; and forming the two conductive layers of a gold alloy having a resistivity of less than 22 $\mu\Omega\cdot$cm and a hardness higher than that of gold.

According to the second thin-film magnetic head or the second method, the conductive layers are each made of a gold alloy having a resistivity of less than 22 $\mu\Omega\cdot$cm and a hardness higher than that of gold. Hence, the resistivity of each of the conductive layers is smaller than the resistivity of a conductive layer made of a laminate of a TiW layer and a Ta layer. In addition, the hardness of the conductive layers is higher than the hardness of a conductive layer made of gold, which prevents the conductive layers from being damaged during processing of the medium facing surface.

A head gimbal assembly of the invention comprises: a slider that includes a thin-film magnetic head and is located to face toward a recording medium; and a suspension that flexibly supports the slider. A hard disk drive of the invention comprises: a slider that includes a thin-film magnetic head and is located to face toward a circular-plate-shaped recording medium that is rotated and driven; and an alignment device that supports the slider and aligns the slider with respect to the recording medium.

In the head gimbal assembly or the hard disk drive of the invention, the thin-film magnetic head comprises: a medium facing surface that faces toward a recording medium; a magnetoresistive element having two surfaces that face toward opposite directions, two side portions, and an end located in the medium facing surface; two bias field applying layers that are adjacent to the side portions of the magnetoresistive element and apply a bias magnetic field to the magnetoresistive element; and two conductive layers that feed a current used for magnetic signal detection to the magnetoresistive element, each of the conductive layers being adjacent to one of surfaces of each of the bias field applying layers and having an end located in the medium facing surface. The conductive layers are each made of a gold alloy having a resistivity of less than 22 $\mu\Omega$·cm and a hardness as high as or higher than a hardness of a material used for making the bias field applying layers.

According to the head gimbal assembly or the hard disk drive of the invention, the conductive layers are each made of a gold alloy having a resistivity of less than 22 $\mu\Omega$·cm and a hardness as high as or higher than a hardness of a material used for making the bias field applying layers. Hence, the resistivity of each of the conductive layers is smaller than the resistivity of a conductive layer made of a laminate of a TiW layer and a Ta layer. In addition, the hardness of the conductive layers is as high as or higher than the hardness of the bias field applying layers, which prevents the conductive layers from being damaged during processing of the medium facing surface.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings. Reference is now made to FIGS. 6A to 11A and FIGS. 6B to 11B to describe a thin-film magnetic head and an outline of a method of manufacturing the same according to the embodiment of the invention. FIGS. 6A to 11A are cross sections each orthogonal to the air bearing surface. FIGS. 6B to 11B are cross sections of the magnetic pole portion each parallel to the air bearing surface.

Figure 6A:
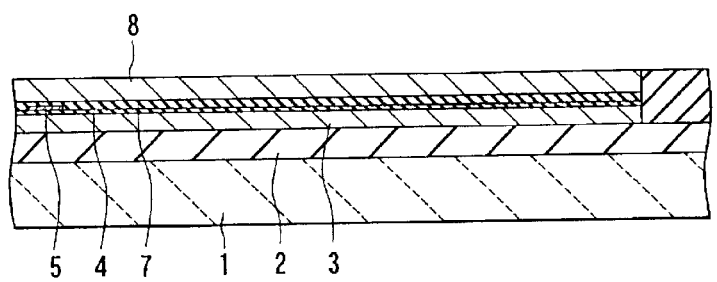
FIGS. 6A and 6B are cross sections for illustrating a step of a method of manufacturing a thin-film magnetic head of the embodiment.
Figure 6B:
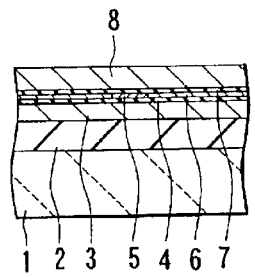

In the manufacturing method, as shown in FIGS. 6A and 6B, an insulating layer 2 of an insulating material such as alumina ($Al_2O_3$) is formed to a thickness of 1 to 5 $\mu$m, for example, by sputtering or the like on a substrate 1 of a ceramic material such as aluminum oxide and titanium carbide ($Al_2O_3$—TiC). On the insulating layer 2, a bottom shield layer 3 of a magnetic material such as Permalloy (NiFe) is formed to a thickness of about 3 $\mu$m, for example, by sputtering, plating or the like, for making a read head.

On the bottom shield layer 3, a bottom shield gap film 4 of an insulating material such as alumina is formed to a thickness of 10 to 200 nm, for example, by sputtering or the like. On the bottom shield gap film 4, an MR element 5 for reading is formed to a thickness of tens of nanometers, for example, by sputtering or the like. The MR element 5 may be an element utilizing a magnetosensitive film exhibiting magnetoresistivity, such as an AMR (anisotropic magnetoresistive) element, a GMR (giant magnetoresistive) element, and a TMR (tunnel magnetoresistive) element.

Then, on the bottom shield gap film 4, a pair of conductive layers 6 are formed to a thickness of tens of nanometers by sputtering or the like. The conductive layers 6 are electrically connected to the MR element 5. Then, on the bottom shield gap film 4 and the MR element 5, a top shield gap film 7 of an insulating material such as alumina is formed to a thickness of 10 to 200 nm, for example, by sputtering or the like.

The above-mentioned layers making up the read head are patterned through a general etching method using a patterned resist, a liftoff method, or a combination thereof.

On the top shield gap film 7, a top-shield-layer-cum-bottom-pole-layer (hereinafter called a bottom pole layer) 8 is formed by sputtering or plating, to a thickness of about 3 to 4 $\mu$m, for example. The bottom pole layer 8 is made of a magnetic material and used for both read head and write head. The magnetic material used for the bottom pole layer 8 is a soft magnetic material such as NiFe, CoFe, CoFeNi, and FeN.

In place of the bottom pole layer 8, there may be provided a top shield layer, a separation layer made of a nonmagnetic material such as alumina and formed on the top shield layer by sputtering or the like, and a bottom pole layer formed on the separation layer.

Figures 7A, 7B:
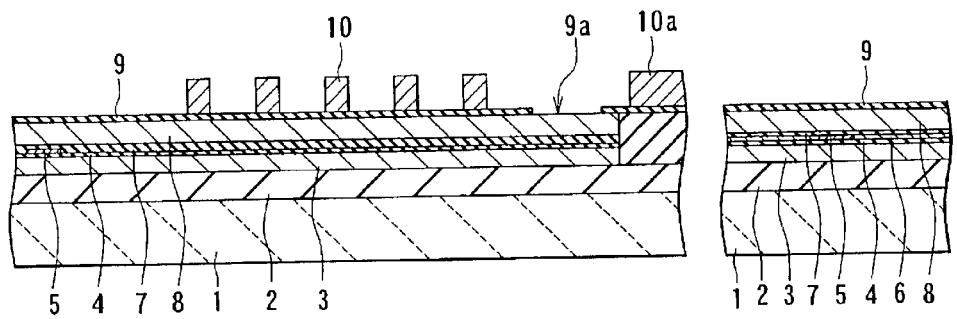
FIGS. 7A and 7B are cross sections for illustrating a step that follows FIGS. 6A and 6B.

Next, as shown in FIGS. 7A and 7B, a write gap layer 9 of an insulating material such as alumina is formed on the bottom pole layer 8 to a thickness of 50 to 300 nm, for example, by sputtering or the like. Next, a portion of the write gap layer 9 located in the center portion of a thin-film coil to be described later is etched to form a contact hole 9a for making a magnetic path.

On the write gap layer 9, a first layer 10 of the thin-film coil made of copper (Cu), for example, is formed to a thickness of 2 to 3 $\mu$m, for example. In FIG. 7A, reference numeral 10a represents a connecting portion of the first layer 10 to be connected to a second layer 15 of the thin-film coil described later. The first layer 10 of the coil is wound around the contact hole 9a.

Figures 8A, 8B:
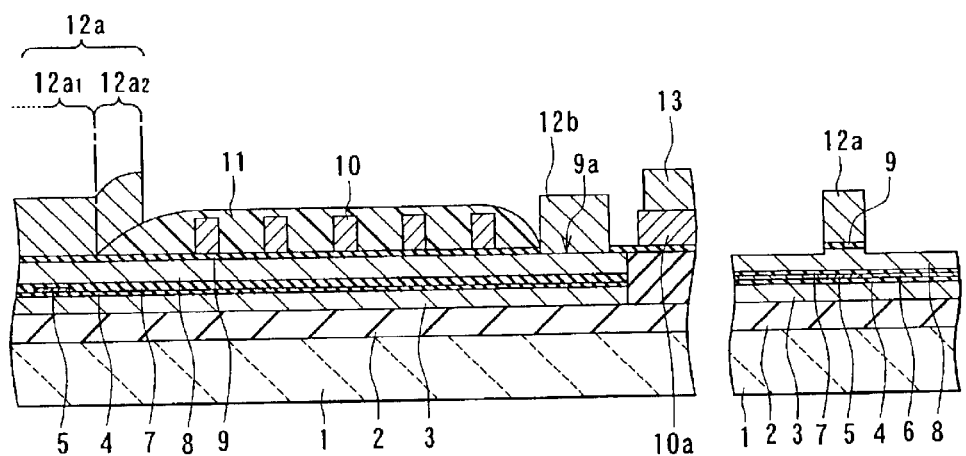
FIGS. 8A and 8B are cross sections for illustrating a step that follows FIGS. 7A and 7B.

Next, as shown in FIGS. 8A and 8B, an insulating layer 11 is formed in a predetermined pattern to cover the first layer 10 of the coil and portions of the write gap layer 9 around the same. The insulating layer 11 is made of an organic insulating material which exhibits fluidity when heated, such as photoresist. Heat treatment is then performed at a predetermined temperature to flatten the surface of the insulating layer 11. As a result of the heat treatment, each of the outer and inner circumferential ends of the insulating layer 11 has a rounded and inclined surface configuration.

On the write gap layer 9 and the insulating layer 11, a track width defining layer 12a of a top pole layer 12 is formed using a magnetic material for making a write head. The track width defining layer 12a extends from an inclined portion of the insulating layer 11 on a side of an air bearing surface 20 (the left side of FIG. 8A) to be described later to the air bearing surface 20. The top pole layer 12 is made up of the track width defining layer 12a, and a coupling portion layer 12b and a yoke portion layer 12c to be described later.

The track width defining layer 12a has an end portion $12a_1$ and a connecting portion $12a_2$. The end portion $12a_1$ is formed on the write gap layer 9 and serves as the magnetic pole portion of the top pole layer 12. The connecting portion $12a_2$ is formed on the inclined portion of the insulating layer 11 on the side of the air bearing surface 20 and is connected to the yoke portion layer 12c. The width of the end portion $12a_1$ is equal to the write track width. That is, the end portion $12a_1$ defines the write track width.

Concurrently with the formation of the track width defining layer 12a, the coupling portion layer 12b is formed on the contact hole 9a and a connecting layer 13 is formed on the connecting portion 10a. The coupling portion layer 12b is made of a magnetic material and constitutes a portion of the top pole layer 12 that is magnetically coupled to the bottom pole layer 8. The connecting layer 13 is made of a magnetic material.

Then, the write gap layer 9 and at least part of the magnetic pole portion of the bottom pole layer 8 located on the side of the write gap layer 9 are etched around the track width defining layer 12a, using the track width defining layer 12a as a mask. For example, reactive ion etching is used to etch the write gap layer 9, and ion milling is used to etch the bottom pole layer 8. The resultant structure as shown in FIG. 8B is called a trim structure, in which sidewalls of the magnetic pole portion of the top pole layer 12 (the end portion $12a_1$ of the track width defining layer 12a), the write gap layer 9 and at least part of the magnetic pole portion of the bottom pole layer 8 are formed vertically in a self-aligned manner.

Figures 9A, 9B:
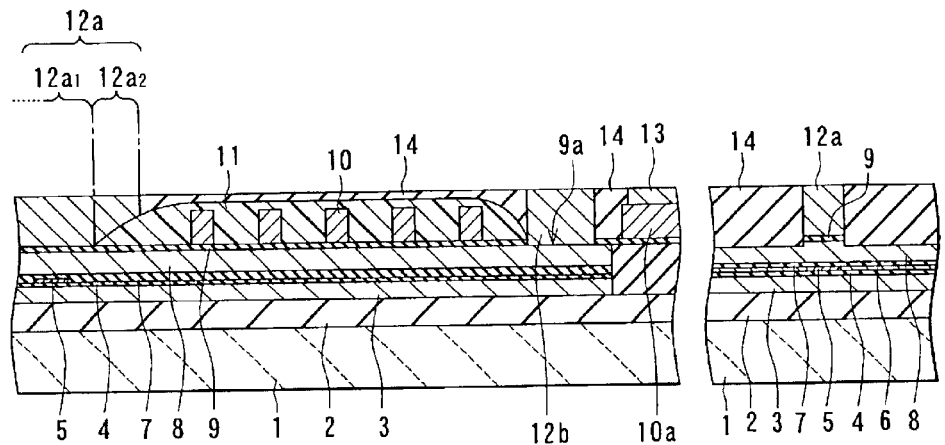
FIGS. 9A and 9B are cross sections for illustrating a step that follows FIGS. 8A and 8B.

Next, as shown in FIGS. 9A and 9B, an insulating layer 14 of an inorganic insulating material such as alumina is formed over the entire surface to a thickness of 3 to 4 $\mu$m, for example. The insulating layer 14 is then polished by chemical mechanical polishing, for example, so that the track width defining layer 12a, the coupling portion layer 12b and the connecting layer 13 are exposed, and the surface is flattened.

Figures 10A, 10B:
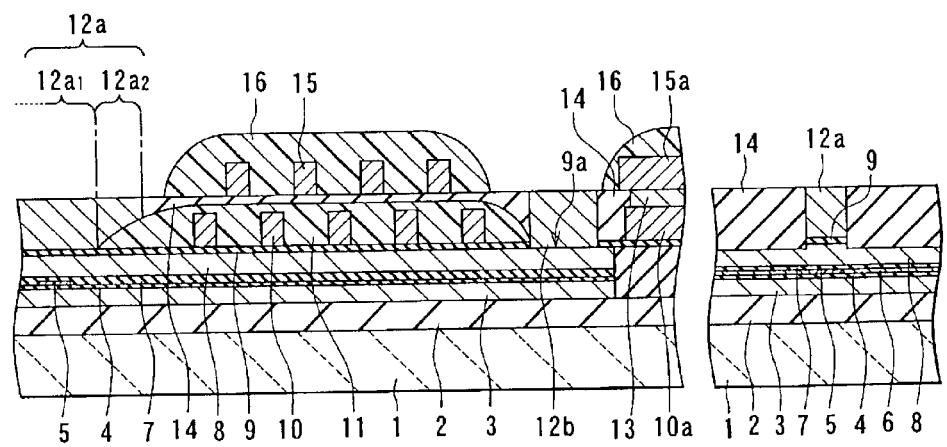
FIGS. 10A and 10B are cross sections for illustrating a step that follows FIGS. 9A and 9B.

Next, as shown in FIGS. 10A and 10B, the second layer 15 of the thin-film coil made of copper (Cu), for example, is formed on the flattened insulating layer 14 to a thickness of 2 to 3 $\mu$m, for example. In FIG. 10A, reference numeral 15a represents a connecting portion of the second layer 15 that is connected to the connecting portion 10a of the first layer 10 via the connecting layer 13. The second layer 15 is wound around the coupling portion layer 12b.

Next, an insulating layer 16 is formed in a predetermined pattern so as to cover the second layer 15 of the thin-film coil and portions of the insulating layer 14 around the same. The insulating layer 16 is made of an organic insulating material which exhibits fluidity when heated, such as photoresist. Then, heat treatment is performed at a predetermined temperature to flatten the surface of the insulating layer 16. As a result of the heat treatment, each of the inner and outer circumferential ends of the insulating layer 16 has a rounded and inclined surface configuration.

Figures 11A, 11B:
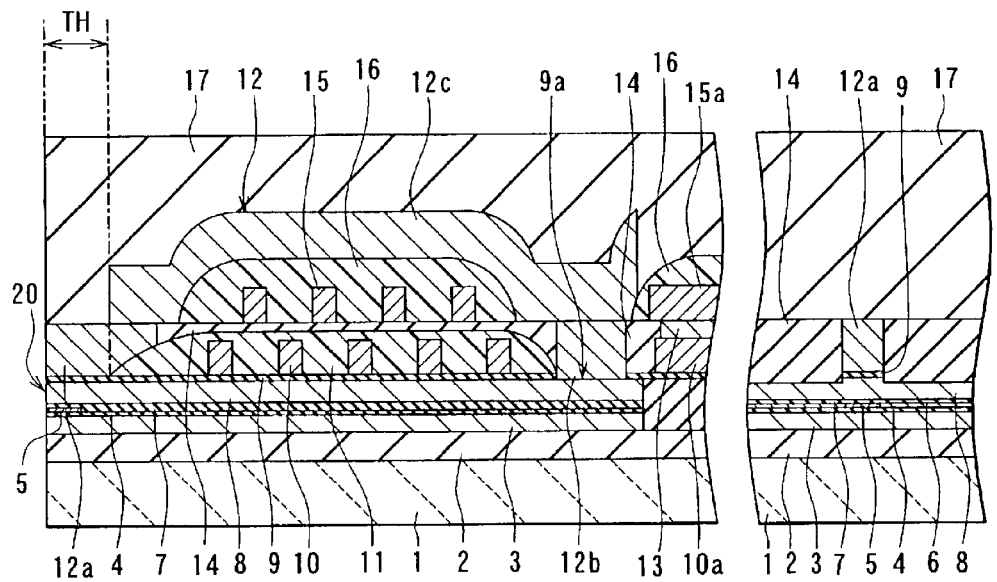
FIGS. 11A and 11B are cross sections for illustrating a step that follows FIGS. 10A and 10B.

Next, as shown in FIGS. 11A and 11B, the yoke portion layer 12c is formed on the track width defining layer 12a, the insulating layers 14 and 16 and the coupling portion layer 12b. The yoke portion layer 12c is made of a magnetic material used for making the write head, such as Permalloy, and constitutes a yoke portion of the top pole layer 12. An end of the yoke portion layer 12c facing the air bearing surface 20 is located at a distance from the air bearing surface 20. The yoke portion layer 12c is connected to the bottom pole layer 8 via the coupling portion layer 12b.

Then, an overcoat layer 17 of alumina, for example, is formed to cover the entire surface. Finally, machine processing of the slider including the foregoing layers is performed to form the air bearing surface 20 of the thin-film magnetic head including the write head and the read head, thereby completing the thin-film magnetic head. The machine processing of the slider includes lapping of the air bearing surface 20.

The thin-film magnetic head of this embodiment fabricated as described above comprises a medium facing surface (air bearing surface 20) that faces toward a recording medium, and the read head and the write head (induction-type electromagnetic transducer). The read head incorporates the MR element 5, and the bottom shield layer 3 and the top shield layer (bottom pole layer 8) for shielding the MR element 5. Portions of the bottom shield layer 3 and the top shield layer located on a side of the air bearing surface 20 are opposed to each other, the MR element 5 being located between these portions.

The write head incorporates the bottom pole layer 8 and the top pole layer 12 magnetically coupled to each other, each of which includes at least one layer. The bottom pole layer 8 and the top pole layer 12 include the magnetic pole portions that are opposed to each other and located in regions of the pole layers on a side of the air bearing surface 20. The write head further incorporates the write gap layer 9 provided between the magnetic pole portions of the bottom and top pole layers 8 and 12, and the thin-film coil including the first and second layers 10 and 15, at least part of the coil being disposed between the bottom and top pole layers 8 and 12 and insulated from the bottom and top pole layers 8 and 12. In the thin-film magnetic head of the embodiment, as shown in FIG. 11A, the length from the air bearing surface 20 to the air-bearing-surface-side end of the insulating layer 11 is a throat height TH. The throat height is the length (height) of portions of the two pole layers facing each other with the write gap layer in between, from the air-bearing-surface-side end to the other end.

Figure 1:
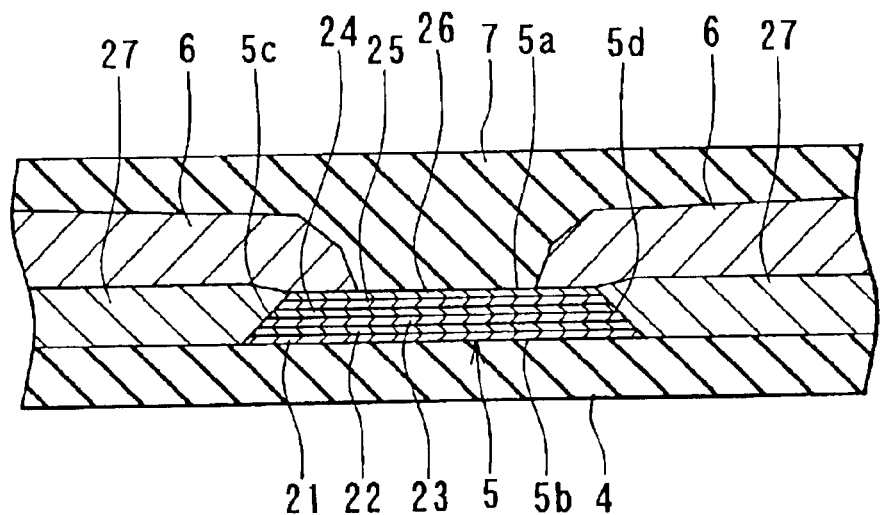
FIG. 1 is a cross section of a read head of an embodiment of the invention that is parallel to the air bearing surface.

Reference is now made to FIG. 1 to describe a configuration of the read head of this embodiment. FIG. 1 shows a cross section of the read head of this embodiment that is parallel to the air bearing surface.

As shown in FIG. 1, the read head of this embodiment comprises: the MR element 5 having two surfaces 5a and 5b that face toward opposite directions, two side portions 5c and 5d, and an end located in the air bearing surface 20. The side portions 5c and 5d connect the two surfaces 5a and 5b to each other, and extend substantially perpendicularly to the air bearing surface 20.

The read head further comprises two bias field applying layers 27 and two conductive layers 6. The two bias field applying layers 27 are located adjacent to the side portions 5c and 5d of the MR element 5 and apply a longitudinal bias field to the MR element 5. The two conductive layers 6 each have an end located in the air bearing surface 20, and are located adjacent to one of the surfaces (the top surface of FIG. 1) of each of the bias field applying layers 27, so as to feed a sense current used for magnetic signal detection to the MR element 5. Although in FIG. 1 the conductive layers 6 are located on top of the bias field applying layers 27, the conductive layers 6 are located on the bottom shield gap film 4 in the region in which the bias field applying layers 27 are not formed. The MR element 5, the bias field applying layers 27 and the conductive layers 6 are covered with the bottom shield gap film 4 and the top shield gap film 7.

The expression 'adjacent' used in the description of this embodiment includes the case in which two layers directly touch each other and the case in which two layers are next to each other with a bonding layer located between the two layers.

Each of the two conductive layers 6 is located such that a portion thereof is laid over (hereinafter expressed as "overlap") the surface 5a of the MR element, and is electrically connected to the surface 5a.

The MR element 5 is, for example, a spin-valve GMR element. Now, described is an example of a composition of the GMR element serving as the MR element 5. The GMR element includes a base layer 21, a soft magnetic layer (free layer) 22, a nonmagnetic layer 23, a pinned layer 24, an antiferromagnetic layer 25, and a protection layer 26, that are stacked in that order on the bottom shield gap film 4.

The base layer 21 has a thickness of 2 to 6 nm, for example, and is made of a material such as Ta, NiCr and NiFeCr.

The soft magnetic layer 22 is a layer in which the direction of magnetization varies in response to the signal magnetic field supplied from the recording medium. The soft magnetic layer 22 has a thickness of 1.0 to 8.0 nm, for example, and may be made up of a single layer or two layers or more. An example in which the soft magnetic layer 22 is made up of two soft magnetic layers will now be given. One of the two layers that is closer to the base layer 21 is called a first soft magnetic layer. The other one that is closer to the nonmagnetic layer 23 is called a second soft magnetic layer.

The first soft magnetic layer has a thickness of 0.5 to 8 nm, for example, and may be made of a magnetic material including at least Ni among the group consisting of Ni, Co, Fe, Ta, Cr, Rh, Mo and Nb. To be specific, the first soft magnetic layer is preferably made of $[Ni_xCo_yFe_{100-(x+y)}]_{100-z}M_{Iz}$. $M_I$ represents at least one of Ta, Cr, Rh, Mo and Nb. In the formula, x, y and z fall within the ranges of $75 \leq x \leq 90$, $0 \leq y \leq 15$, and $0 \leq z \leq 15$, respectively, in atomic percent.

The second soft magnetic layer has a thickness of 0.5 to 3 nm, for example, and may be made of a magnetic material including at least Co among the group consisting of Ni, Co, and Fe. To be specific, the second soft magnetic layer is preferably made of $Co_xFe_yNi_{100-(x+y)}$ in which the (111) plane is oriented along the direction in which the layers are stacked. In the formula, x and y fall within the ranges of $70 \leq x \leq 100$ and $0 \leq y \leq 25$, respectively, in atomic percent.

The nonmagnetic layer 23 has a thickness of 1.0 to 3.0 nm, for example, and may be made of a nonmagnetic conductive material that includes 80 weight % or greater of at least one element among the group consisting of Cu, Au and Ag.

The pinned layer 24 is a layer whose direction of magnetization is fixed. The antiferromagnetic layer 25 is a layer that fixes the direction of magnetization of the pinned layer 24.

The direction of magnetization is fixed in the pinned layer 24, due to the exchange coupling at the interface between the antiferromagnetic layer 25 and the pinned layer 24. The pinned layer 24 may have a structure in which a first ferromagnetic layer, a coupling layer and a second ferromagnetic layer are stacked in this order on the nonmagnetic layer 23. The first and second ferromagnetic layers may be made of a ferromagnetic material including at least Co among the group consisting of Co and Fe. In particular, it is preferred that the (111) plane of this ferromagnetic material is oriented along the direction in which the layers are stacked. The total thickness of the two ferromagnetic layers is 1.5 to 5 nm, for example. The two ferromagnetic layers are antiferromagnetic-coupled to each other and the directions of magnetization thereof are fixed to opposite directions.

The coupling layer of the pinned layer 24 has a thickness of 0.2 to 1.2 nm, for example, and may be made of a nonmagnetic material including at least one element among the group consisting of Ru, Rh, Ir, Re, Cr and Zr. The coupling layer is provided for creating antiferromagnetic exchange coupling between the first and second ferromagnetic layers, and fixing the magnetizations of these layers in opposite directions. The magnetizations of the first and second ferromagnetic layers in opposite directions include not only the case in which there is a difference of 180 degrees between these directions of magnetizations, but also the case in which there is a difference of 180±20 degrees between them.

The antiferromagnetic layer 25 has a thickness of 5 to 30 nm, for example, and may be made of an antiferromagnetic material including Mn and at least one element $M_{II}$ among the group consisting of Pt, Ru, Rh, Pd, Ni, Au, Ag, Cu, Ir, Cr and Fe. The Mn content preferably falls within the range of 35 to 95 atomic % inclusive. The content of the other element $M_{II}$ preferably falls within the range of 5 to 65 atomic % inclusive. Types of antiferromagnetic material include a non-heat-induced antiferromagnetic material that exhibits antiferromagnetism without any heat treatment and that induces an exchange coupling magnetic field between a ferromagnetic material and itself. Another type of antiferromagnetic material is a heat-induced antiferromagnetic material that exhibits antiferromagnetism when heat treatment is given. The antiferromagnetic layer 25 may be made of either of these types.

The non-heat-induced antiferromagnetic material includes an Mn alloy that has a γ phase, such as RuRhMn, FeMn, or IrMn. The heat-induced antiferromagnetic material includes an Mn alloy that has a regular crystal structure, such as PtMn, NiMn, and PtRhMn.

The protection layer 26 has a thickness of 1 to 10 nm, for example, and may be made of Ta. The protection layer 26 may have a two-layer structure made up of a combination of a Ta layer and an Ru layer, for example, or may have a three-layer structure made up of a combination of a Ta layer, an Ru layer, and a Ta layer, for example.

An example of combination of thicknesses and materials of the foregoing layers will now be given. In the example, the base layer 21 is a 5-nm-thick NiFeCr layer. The soft magnetic layer 22 is a laminate of a 4-nm-thick NiFe layer and a 1-nm-thick CoFe layer. The nonmagnetic layer 23 is a 2.1-nm-thick Cu layer. The pinned layer 24 has a structure in which a 2-nm-thick CoFe layer that functions as the first ferromagnetic layer, a 0.8-nm-thick Ru layer that functions as the coupling layer, and a 1.5-nm-thick CoFe layer that functions as the second ferromagnetic layer are stacked in this order. The antiferromagnetic layer 25 is a 15-nm-thick PtMn layer. The protection layer 26 is a 3-nm-thick Ta layer.

The bias field applying layers 27 are made up of hard magnetic layers (hard magnets) or a laminate of a ferromagnetic layer and an antiferromagnetic layer, for example. Here, as an example, the bias field applying layers 27 are each made of a CoCrPt layer.

The conductive layers 6 are made of a gold alloy having a resistivity of less than 22 $\mu\Omega$·cm and a hardness higher than that of gold (Au). It is preferable that the hardness of the gold alloy is as high as or higher than that of the material used for making the bias field applying layers 27. It is also preferable that the conductive layers 6 each have a sheet resistivity equal to or less than one-eighth of a sheet resistivity of the MR element 5 to which the conductive layers 6 are located adjacently. In this case, it is preferable that the conductive layers 6 each have a sheet resistivity of 2 $\Omega$/square or less. Also, the gold alloy making the conductive layers 6 preferably contains nickel (Ni) or copper (Cu) as an additive to gold. The reasons why will be described in detail later.

Figure 2:
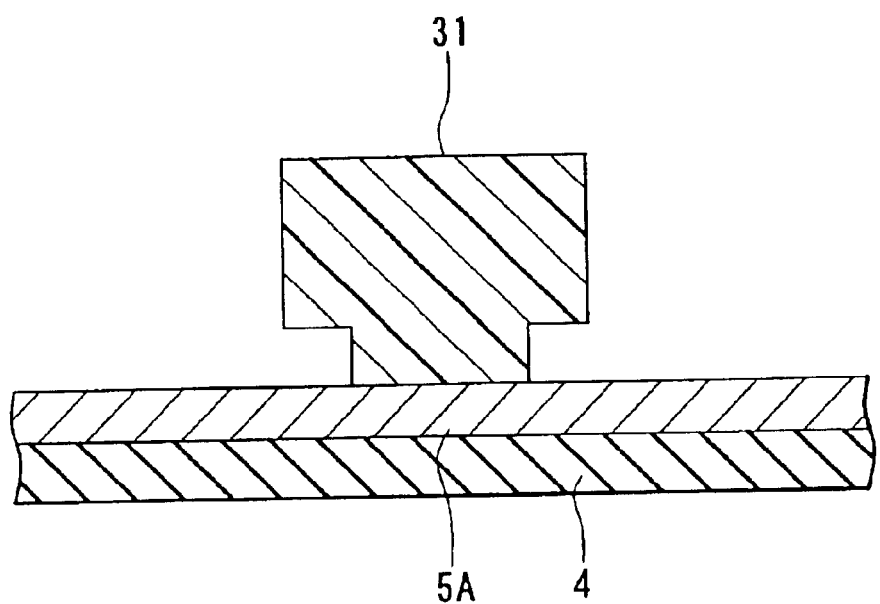
FIG. 2 is a cross section for illustrating a step of a method of manufacturing the read head of the embodiment.

Reference is now made to FIGS. 1 to 5 to describe a method of manufacturing the read head of the embodiment. In the method, as shown in FIG. 2, an MR film 5A that will be made into the MR element 5 is formed first on the bottom shield gap film 4 by sputtering, for example. Then, a resist mask 31 for patterning the MR film 5A is formed on the MR film 5A by photolithography.

Figure 3:
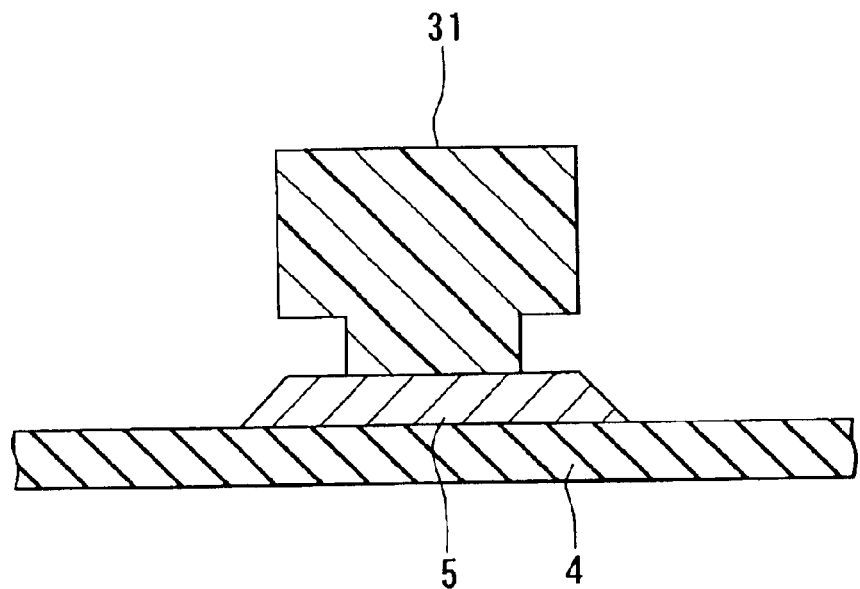
FIG. 3 is a cross section for illustrating a step that follows FIG. 2.

Then, the MR film 5A is selectively etched by ion milling, for example, using the resist mask 31, and thereby patterned to form the MR element 5, as shown in FIG. 3.

Figure 4:
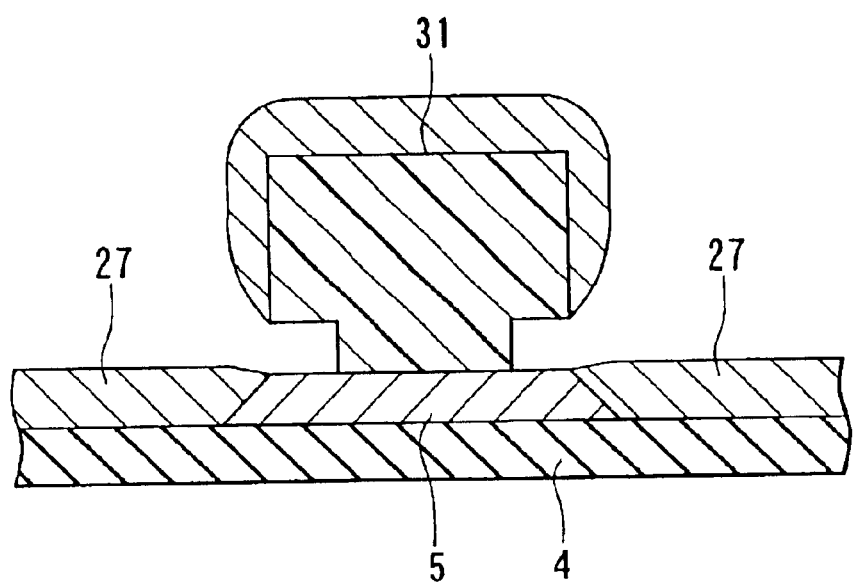
FIG. 4 is a cross section for illustrating a step that follows FIG. 3.

Then, as shown in FIG. 4, the two bias field applying layers 27 are formed on the bottom shield gap film 4 respectively on both sides of the MR element 5 by the liftoff method using the resist mask 31. To be specific, on the bottom shield gap film 4, the two bias field applying layers 27 are formed on both sides of the MR element 5 by sputtering, for example, while the resist mask 31 is left unremoved, and thereafter, the resist mask 31 is removed.

Figure 5:
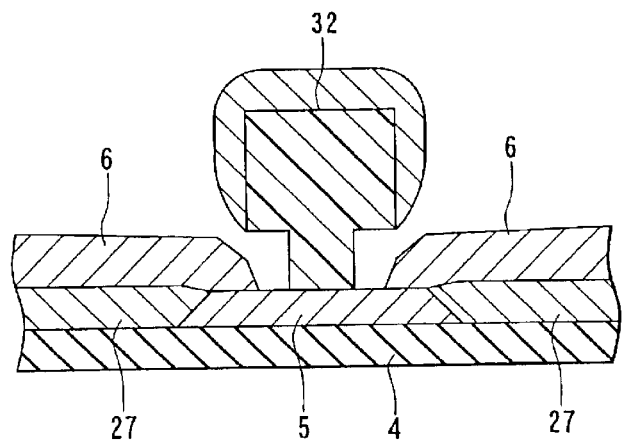
FIG. 5 is a cross section for illustrating a step that follows FIG. 4.

Then, as shown in FIG. 5, a resist mask 32 for forming the conductive layers 6 is formed on the MR element 5 by photolithography. Using the resist mask 32, the conductive layers 6 are formed on the two bias field applying layers 27 by the liftoff method. To be specific, the conductive layers 6 are formed on the bias field applying layers 27 by sputtering, for example, using the resist mask 32, and thereafter, the resist mask 32 is removed. The conductive layers 6 are formed so as to overlap the top surface of the MR element 5. Finally, as shown in FIG. 1, the top shield gap film 7 is formed to cover the entire surface.

The operations of the thin-film magnetic head of this embodiment will now be described. The thin-film magnetic head writes data on a recording medium through the use of the write head, and reads data stored on the recording medium through the use of the read head.

In the read head, the direction of the bias magnetic field created by the bias field applying layers 27 is perpendicular to the direction orthogonal to the air bearing surface 20. In the MR element 5, the direction of magnetization of the soft magnetic layer 22 is equal to the direction of the bias magnetic field when no signal magnetic field is present. The direction of magnetization of the pinned layer 24 is fixed to the direction orthogonal to the air bearing surface 20.

In the MR element 5, the direction of magnetization of the soft magnetic layer 22 changes in response to the signal magnetic field supplied from the recording medium. The relative angle between the direction of magnetization of the soft magnetic layer 22 and the direction of magnetization of the pinned layer 24 is thereby changed. As a result, the resistance value of the MR element 5 is changed. The resistance value of the MR element 5 is obtained by finding the potential difference between the two conductive layers 6 when a sense current is fed to the MR element 5 from the conductive layers 6. The read head thus reads the data stored on the recording medium.

According to the embodiment, the bias field applying layers 27 are located on both sides of the MR element 5, so that Barkhausen noise is reduced. However, regions (hereinafter called dead regions) are created near ends of the soft magnetic layer 22 of the MR element 5 that are adjacent to the bias field applying layers 27. In these regions the magnetic field produced from the bias field applying layers 27 fixes the direction of magnetization, and sensing of a signal magnetic field is thereby prevented. The sense current that passes through the dead regions do not contribute to producing outputs of the read head. Therefore, the output of the read head is reduced when a greater sense current passes through the dead regions.

According to the embodiment, the two conductive layers 6 overlap the surface 5a of the MR element 5, so that it is possible to reduce the sense current flowing from the conductive layers 6 through the bias field applying layers 27 into the dead regions of the soft magnetic layer 22.

In order to increase an S/N ratio of the read head, it is preferable to lower the resistance of the entire read head including the MR element 5 and the conductive layers 6, and to this end, it is preferable to lower the resistance of the conductive layers 6.

On the other hand, if the hardness of the conductive layers 6 is too low, during lapping of the air bearing surface 20 the conductive layers 6 extend in the air bearing surface 20 to adhere to the MR element 5, which causes the resistance value of the MR element 5 to change or produces a step in the air bearing surface 20 between the end of each of the conductive layers 6 and the end of another layer. In order to prevent occurrences of problems resulting from damages to the conductive layers 6 during lapping of the air bearing surface 20, it is preferable that the conductive layers 6 have a certain level of hardness.

For these reasons, in this embodiment, the conductive layers 6 are made of a gold alloy having a resistivity of less than 22 $\mu\Omega$·cm and a hardness higher than that of gold. Conventional conductive layers made up of a laminate of a TiW layer and a Ta layer have a resistivity of approximately 22 $\mu\Omega$·cm. Thus, the resistivity of the conductive layers 6 of this embodiment is smaller than the resistivity of the conventional conductive layers made up of a laminate of a TiW layer and a Ta layer, thereby making it possible to sufficiently lower the resistance of the conductive layers 6. On the other hand, the hardness of the conductive layers 6 is higher than the hardness of conductive layers made of gold. This makes it possible to prevent the conductive layers 6 from being damaged during lapping of the air bearing surface 20.

In general, the hardness of the material used for making the bias field applying layers 27 is sufficiently higher than the hardness of gold. Hence, the bias field applying layers 27 are hardly damaged during lapping of the air bearing surface 20. For this reason, it is preferable that the gold alloy for making the conductive layers 6 has a hardness as high as or higher than that of the material for the bias field applying layers 27. For example, the Vickers hardness of CoCrPt employable as the material for the bias field applying layers 27 is 131. Hence, when CoCrPt is used as the material for the bias field applying layers 27, it is preferable that the Vickers hardness of the gold alloy for making the conductive layers 6 is 131 or higher.

Now, described is an experiment conducted to study a relationship among the additive content (atomic %) of the gold alloy, the sheet resistivity and Vickers hardness of the conductive layers 6 made of the gold alloy. In the experiment, a plurality of kinds of thin films to serve as the conductive layers 6 were prepared using various kinds of gold alloys containing additives at different percentages as shown in Table 1 below. Each thin film was made to have a thickness of 100 nm. In the experiment, sheet resistivity and Vickers hardness were measured for each of the plurality of kinds of thin films. The measurement results are shown in Table 1 below. In Table 1, resistivity was obtained by multiplying the sheet resistivity by the thickness of the thin film (100 nm). For the row in Table 1 without any additive, the values of the sheet resistivity, resistivity, and Vickers hardness are those measured for a thin film made of gold alone.

TABLE 1

| Additive to gold | Content (atomic %) | Sheet resistivity (Ω/square) | Resistivity ($\mu\Omega$ · cm) | Vickers hardness |
| --- | --- | --- | --- | --- |
| — | — | 0.1688 | 1.688 | 15 |
| Ti | 0.15 | 0.4424 | 4.424 | 25 |
| Ti | 0.51 | 0.7017 | 7.017 | 37 |
| Ti | 2.71 | 3.1054 | 31.054 | 105 |
| Ni | 1.57 | 0.6569 | 6.569 | 117 |
| Ni | 4.67 | 0.8676 | 8.676 | 184 |
| Ni | 6.32 | 0.9965 | 9.965 | 192 |
| Cu | 3.10 | 0.5770 | 5.770 | 187 |
| Cu | 6.72 | 0.7059 | 7.059 | 224 |
| Cu | 9.10 | 0.8286 | 8.286 | 301 |

Figure 12:
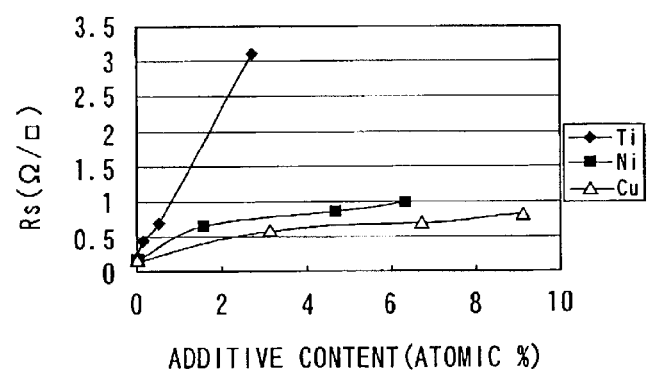
FIG. 12 is a plot that shows results of an experiment performed to study the relationship among the additive content of a gold alloy, the sheet resistivity and Vickers hardness of a conductive layer made of the gold alloy.
Figure 13:
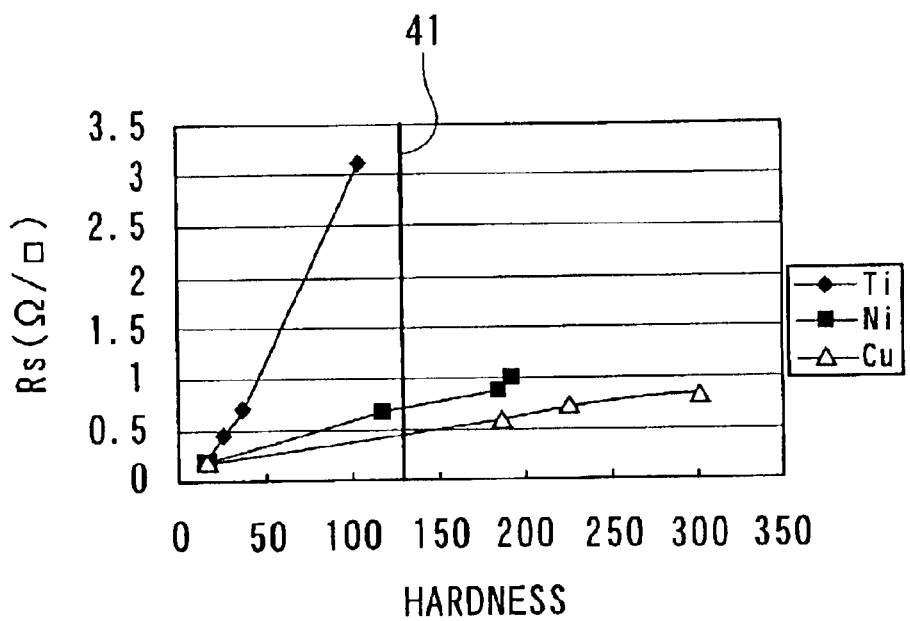
FIG. 13 is a plot that shows results of the experiment performed to study the relationship among the additive content of a gold alloy, the sheet resistivity and Vickers hardness of a conductive layer made of the gold alloy.

FIG. 12 illustrates the relationship between the additive content and the sheet resistivity of the thin films for each of the three different additives based on the experiment results shown in Table 1. On the other hand, FIG. 13 illustrates the relationship between the Vickers hardness and the sheet resistivity of the thin films for each of the three different additives based on the experiment results shown in Table 1. In FIG. 13, line 41 indicates the position of the Vickers hardness (131) of CoCrPt used as the material for the bias field applying layers 27.

In the experiment, Ti, Ni, and Cu were used as the additives to gold. It is understood from the experiment results that a thin film made of a gold alloy containing Ni or Cu as the additive to gold can achieve a high hardness while maintaining a small resistivity (sheet resistivity), as compared with a thin film made of a gold alloy containing Ti as the additive.

Figure 14:
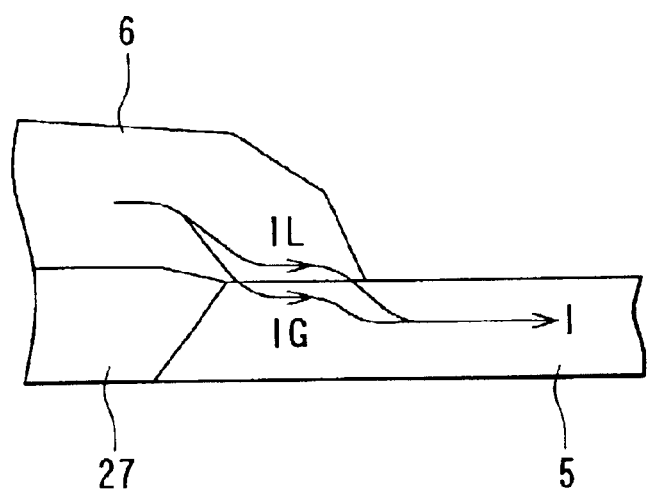
FIG. 14 illustrates a vicinity of portions of one of the conductive layers and an MR element of the embodiment touching each other.

A preferable range of the sheet resistivity of the conductive layers 6 in the read head with an overlapping conductive layer structure will now be discussed. FIG. 14 shows the vicinity of portions of one conductive layer 6 and the MR element 5 touching each other in the read head. As shown in FIG. 14, a total current I flowing from the conductive layer 6 into the MR element 5 through the portions of the conductive layer 6 and the MR element 5 touching each other diverts at the vicinity of the portions of the conductive layer 6 and the MR element 5 touching each other to a current IL flowing through the conductive layer 6 and a current IG flowing through the MR element 5, and then the two currents merge into one current that flows through the MR element 5.

Figure 15:
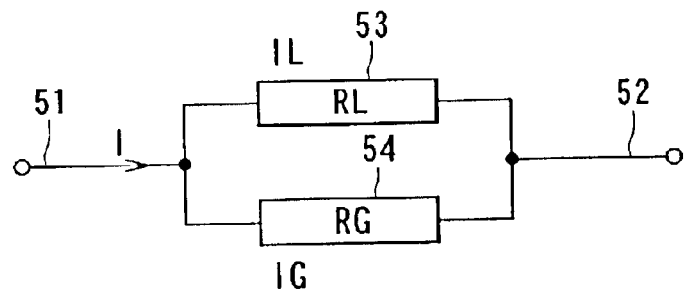
FIG. 15 is a circuit diagram showing an equivalent circuit in the vicinity of the portions of the conductive layer and the MR element touching each other shown in FIG. 14.

FIG. 15 is a circuit diagram showing an equivalent circuit in the vicinity of the portions of the conductive layer 6 and the MR element 5 touching each other shown in FIG. 14. In FIG. 15, numeral 51 denotes a current path in the conductive layer 6 through which the current I flows, and numeral 52 denotes a current path in the MR element 5 through which the current I flows. A current path 53 through which the current IL flows and a current path 54 through which the current IG flows are present between the current paths 51 and 52. The current paths 53 and 54 are connected in parallel. It is assumed that the resistance of the current path 53 corresponds to the sheet resistivity RL of the conductive layer 6, and the resistance of the current path 54 corresponds to the sheet resistivity RG of the MR element 5. Hereinafter, the ratio of the sheet resistivity RG to the sheet resistivity RL, that is, RG/RL, is referred to as the sheet resistivity ratio a. On the other hand, the ratio of the current IL to the total current I, that is, IL/I, is referred to as the conductive layer current diverting ratio. The conductive layer current diverting ratio IL/I is expressed by the following equation:

$$IL/I = RG/(RG+RL)$$

$$= RG/(RG+RG/a)$$

$$= a/(1+a).$$

Figure 16:
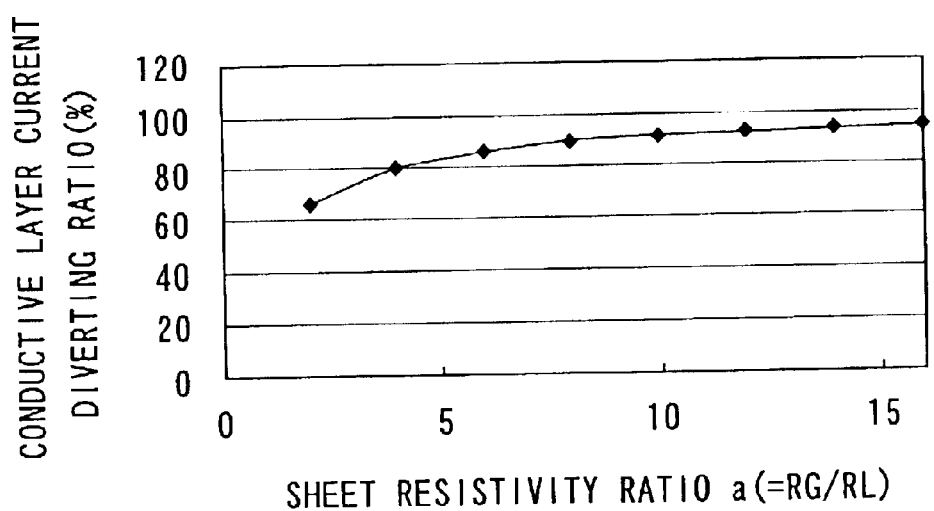
FIG. 16 is a plot that shows the relationship between the sheet resistivity ratio and the conductive layer current diverting ratio according to the embodiment.

The relationship between the sheet resistivity ratio a (=RG/RL) and the conductive layer current diverting ratio IL/I (%) was determined by calculation, and the results are shown in Table 2 below and in FIG. 16.

TABLE 2

| a | IL/I (%) |
| --- | --- |
| 2 | 66.7 |
| 4 | 80.0 |

TABLE 2-continued

| a | IL/I (%) |
|---|---|
| 6 | 85.7 |
| 8 | 88.9 |
| 10 | 90.9 |
| 12 | 92.3 |
| 14 | 93.3 |
| 16 | 94.1 |
| 50 | 98.0 |
| 100 | 99.0 |

When conductive layer current diverting ratio IL/I is small, the current IG flowing through the MR element 5 increases in the vicinity of the portions of the conductive layer 6 and the MR element 5 touching each other. This increases a sense current passing through the dead regions of the MR element 5, and accordingly the advantages of the overlapping conductive layer structure cannot be satisfactorily achieved. Thus, a small IL/I is not preferable. Hence, in order to achieve the advantages of the overlapping conductive layer structure satisfactorily with reliability, it is preferable to make the conductive layer current diverting ratio IL/I larger. It is understood from FIG. 16 that when the sheet resistivity ratio a is 8 or higher, the conductive layer current diverting ratio IL/I reaches approximately 90% or higher, thereby making it possible to sufficiently reduce a sense current passing through the dead regions of the MR element 5. Hence, it is preferable that the sheet resistivity ratio a is 8 or higher. In other words, it is preferable that the sheet resistivity RL of the conductive layers 6 is equal to or less than one-eighth of the sheet resistivity RG of the MR element 5. The sheet resistivity RG of the MR element 5 in this embodiment is approximately 16 Ω/square. Hence, it is preferable that the sheet resistivity RL of the conductive layers 6 is approximately 2 Ω/square or less.

In the case where the conductive layers 6 are made of a gold alloy containing Ni as the additive to gold, as can be seen from FIG. 12 and Table 1, the sheet resistivity RL is 1 Ω/square or less when the Ni content falls within the range of approximately 1.6 to approximately 6.3 atomic %, which reliably makes the sheet resistivity RL equal to or less than one-eighth (2 Ω/square or less) of the sheet resistivity RG of the MR element 5. Furthermore, in the case of the gold alloy containing Ni as the additive, as can be seen from FIG. 13 and Table 1, if the Ni content falls within the range of approximately 4.7 to approximately 6.3 atomic %, the hardness of the conductive layers 6 is reliably made as high as or higher than the hardness of the bias field applying layers 27 made of CoCrPt.

In the case where the conductive layers 6 are made of a gold alloy containing Cu as the additive, as can be seen from FIG. 12 and Table 1, the sheet resistivity RL is 1 Ω/square or less when the Cu content falls within the range of approximately 3.1 to approximately 9.1 atomic %, which reliably makes the sheet resistivity RL equal to or less than one-eighth (2 Ω/square or less) of the sheet resistivity RG of the MR element 5. Furthermore, in the case of the gold alloy containing Cu as the additive, as can be seen from FIG. 13 and Table 1, if the Cu content falls within the range of approximately 3.1 to approximately 9.1 atomic %, the hardness of the conductive layers 6 is reliably made as high as or higher than the hardness of the bias field applying layers 27 made of CoCrPt.

In view of the foregoing, it is preferable that the gold alloy for making the conductive layers 6 contains Ni or Cu as the additive to gold.

In contrast, in the case where the conductive layers 6 are made of a gold alloy containing Ti as the additive, as can be seen from FIG. 12 and Table 1, the sheet resistivity RL exceeds 2 Ω/square when the Ti content is 2 atomic % or higher. Furthermore, as can be seen from FIG. 13 and Table 1, in the case of the gold alloy containing Ti as the additive, the hardness of the conductive layers 6 is not satisfactorily increased as compared with the case of the gold alloy containing Ni or Cu as the additive, and it is difficult to attain the hardness as high as or higher than the hardness of the bias field applying layers 27 made of CoCrPt. Hence, Ti is not suitable for practical use as an additive.

As has been described, in this embodiment the conductive layers 6 are made of a gold alloy having a resistivity of less than 22 $\mu\Omega$·cm and a hardness higher than the hardness of gold. Hence, according to the embodiment, it is possible to prevent the conductive layers 6 from being damaged during lapping of the air bearing surface 20 while sufficiently lowering the resistance of the conductive layers 6. As a result, it is possible to achieve satisfactory magnetic signal reading characteristics of the read head.

In this embodiment, in order to prevent the conductive layers 6 from being damaged during lapping of the air bearing surface 20, the hardness of the gold alloy is preferably as high as or higher than the hardness of the material used for making the bias field applying layers 27.

Furthermore, it is preferable that the conductive layers 6 each have a sheet resistivity equal to or less than one-eighth (2 Ω/square or less) of the sheet resistivity of the MR element 5 with which the conductive layers 6 are in contact. In this case, it is possible to make full use of the advantages of the overlapping conductive layer structure with reliability.

According to the embodiment, because the conductive layers 6 are made of the gold alloy, better resistances to oxidation and corrosion are achieved as compared with conductive layers made of a Cu layer.

Figure 17:
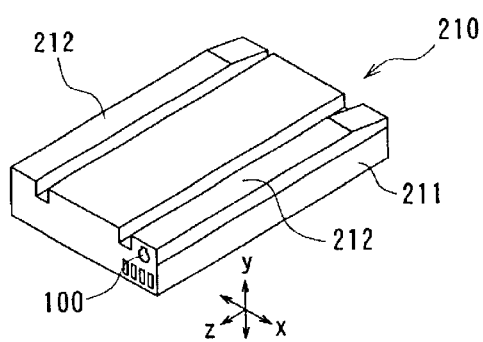
FIG. 17 is a perspective view that illustrates a slider incorporated in a head gimbal assembly of the embodiment.

A head gimbal assembly and a hard disk drive according to this embodiment will now be described. First, with reference to FIG. 17, a slider 210 incorporated in the head gimbal assembly is described. In the hard disk drive, the slider 210 is placed to face toward a hard disk platter that is a circular-plate-shaped recording medium to be rotated and driven. The slider 210 has a base body 211 made up mainly of the substrate 1 and the overcoat layer 17 of FIGS. 11A and 11B. The base body 211 is nearly hexahedron-shaped. One of the six surfaces of the base body 211 faces toward the hard disk platter. Rails 212 are formed in this one of the surfaces. A surface of each of the rails 212 functions as the air bearing surface. A tapered portion or a stepped portion is formed near the air-inflow-side end (the end located at the upper right of FIG. 17) of each of the rails 212. When the hard disk platter rotates in the z direction of FIG. 17, an airflow goes into the tapered portion or stepped portion and passes between the hard disk platter and the slider 210. A lift is thus created below the slider 210 in the y direction of FIG. 17 by the airflow and is exerted on the slider 210. The slider 210 flies over the hard disk platter by means of the lift. The x direction of FIG. 17 is across the track of the hard disk platter. A thin-film magnetic head 100 of this embodiment is formed near the air-outflow-side end (the end located at the lower left of FIG. 17) of the slider 210.

Figure 18:
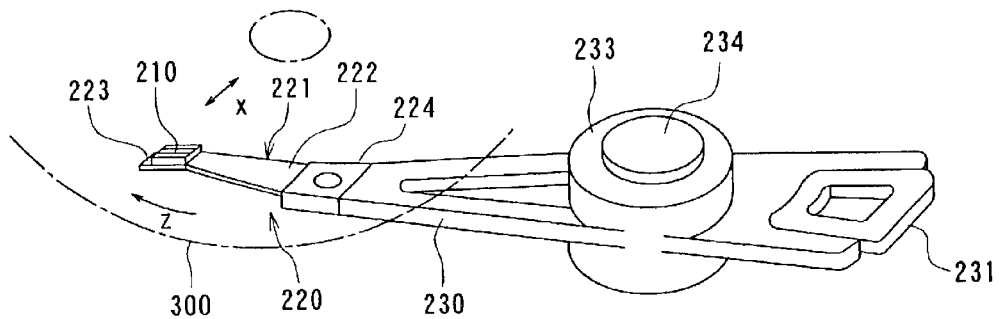
FIG. 18 is a perspective view that illustrates a head arm assembly including the head gimbal assembly of the embodiment.

Reference is now made to FIG. 18 to describe a head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator that moves the slider 210 along the x direction across the track of the hard disk platter 300. The actuator incorporates the arm 230 and a voice coil motor that drives the arm 230. A gimbal section that maintains the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a plurality of head gimbal assemblies 220 and a carriage with a plurality of arms is called a head stack assembly, in which the head gimbal assemblies 220 are each attached to the arms.

FIG. 18 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 19:
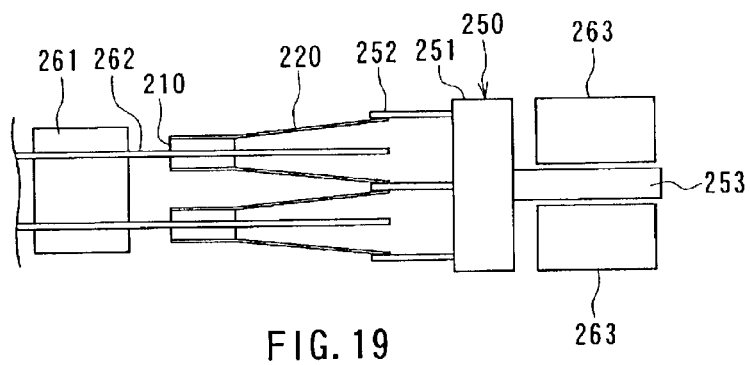
FIG. 19 illustrates a main part of a hard disk drive of the embodiment.
Figure 20:
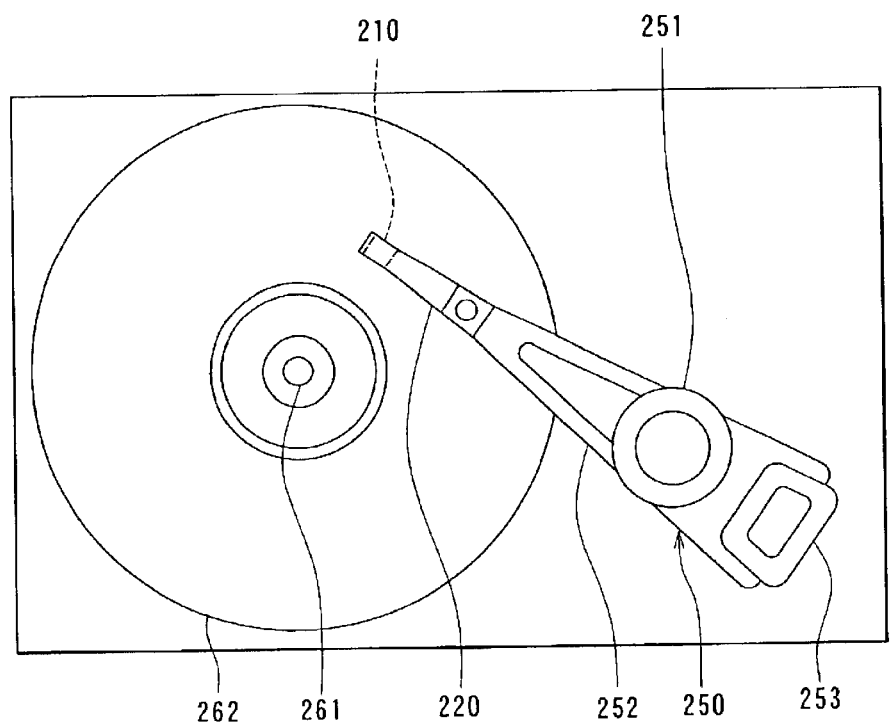
FIG. 20 is a top view of the hard disk drive of the embodiment.

Reference is now made to FIGS. 19 and 20 to describe an example of the head stack assembly and the hard disk drive of the embodiment. FIG. 19 illustrates the main part of the hard disk drive. FIG. 20 is a top view of the hard disk drive. The head stack assembly 250 incorporates a carriage 251 having a plurality of arms 252. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 face each other with each of the platters 262 in between. The voice coil motor includes permanent magnets 263 located to face each other, the coil 253 of the head stack assembly 250 being placed between the magnets 263.

The head stack assembly 250 except the slider 210 and the actuator correspond to the alignment device of the invention and support the slider 210 and align it with respect to the hard disk platter 262.

In the hard disk drive of the embodiment, the actuator moves the slider 210 across the track of the hard disk platter 262 and aligns the slider 210 with respect to the platter 262. The thin-film magnetic head incorporated in the slider 210 writes data on the platter 262 through the use of the write head and reads data stored on the platter 262 through the use of the read head.

The head gimbal assembly and the hard disk drive of the embodiment exhibit the effects similar to those of the foregoing thin-film magnetic head of the embodiment.

The present invention is not limited to the foregoing embodiment but may be practiced in still other ways. For example, although the foregoing embodiment has discussed the read head with the overlapping conductive layer structure as an example, the invention is also applicable to a read head with a structure other than the overlapping conductive layer structure.

The MR element may be made up of the layers stacked in the order reverse to that of the foregoing embodiment.

In the foregoing embodiment, the thin-film magnetic head is disclosed, comprising the read head formed on the base body and the write head stacked on the read head. Alternatively, the read head may be stacked on the write head.

If the thin-film magnetic head is dedicated to reading, the thin-film magnetic head may comprise the read head only.

The thin-film magnetic head of the invention is not only applicable to a head for a hard disk, but also applicable to any devices for reading a magnetic signal from a magnetic recording medium.

As has been described, according to the first thin-film magnetic head or the first manufacturing method, the head gimbal assembly or the hard disk drive of the invention, the conductive layers are made of a gold alloy having a resistivity of less than 22 $\mu\Omega$·cm and a hardness as high as or higher than the hardness of the bias field applying layers. Hence, according to the invention, it is possible to prevent the conductive layers from being damaged during lapping of the medium facing surface while sufficiently lowering the resistance of the conductive layers. Consequently, according to the invention, the thin-film magnetic head can achieve satisfactory magnetic signal reading characteristics.

In the first thin-film magnetic head or the first manufacturing method of the invention, the conductive layers may each have a sheet resistivity equal to or less than one-eighth of the sheet resistivity of the magnetoresistive element with which the conductive layers are in contact. In this case, it is possible to make full use of the advantages of the structure in which each of the two conductive layers is located such that a portion thereof is laid over one of the surfaces of the magnetoresistive element.

According to the second thin-film magnetic head or the second manufacturing method of the invention, the conductive layers are made of a gold alloy having a resistivity of less than 22 $\mu\Omega$·cm and a hardness higher than that of gold. Hence, according to the invention, it is possible to prevent the conductive layers from being damaged during lapping of the medium facing surface while sufficiently lowering the resistance of the conductive layers. Consequently, according to the invention, the thin-film magnetic head can achieve satisfactory magnetic signal reading characteristics.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
    a medium facing surface that faces toward a recording medium;
    a magnetoresistive element having two surfaces that face toward opposite directions, two side portions, and an end located in the medium facing surface;
    two bias field applying layers that are adjacent to the side portions of the magnetoresistive element and apply a bias magnetic field to the magnetoresistive element; and
    two conductive layers that feed a current used for magnetic signal detection to the magnetoresistive element, each of the conductive layers being adjacent to one of surfaces of each of the bias field applying layers and having an end located in the medium facing surface, wherein
    the conductive layers are each made of a gold alloy having a resistivity of less than 22 $\mu\Omega$·cm and a hardness as high as or higher than a hardness of a material used for making the bias field applying layers, each of the conductive layers is located to overlap one of the surfaces of the magnetoresistive element and is in contact with the magnetoresistive element only at the one of the surfaces of the magnetoresistive element, and each of the conductive layers has a sheet resistivity equal to or less than one-eighth of a sheet resistivity of the magnetoresistive element.

2. A thin-film magnetic head according to claim 1, wherein the sheet resistivity of each of the conductive layers is 2 Ω/square or less.

3. A thin-film magnetic head according to claim 1, wherein the gold alloy contains one of nickel and copper as an additive to gold.

4. A method of manufacturing a thin-film magnetic head comprising: a medium facing surface that faces toward a recording medium; a magnetoresistive element having two surfaces that face toward opposite directions, two side portions, and an end located in the medium facing surface; two bias field applying layers that are adjacent to the side portions of the magnetoresistive element and apply a bias magnetic field to the magnetoresistive element; and two conductive layers that feed a current used for magnetic signal detection to the magnetoresistive element, each of the conductive layers being adjacent to one of surfaces of each of the bias field applying layers and having an end located in the medium facing surface, the method comprising the steps of:

forming the magnetoresistive element;

forming the two bias field applying layers; and forming the two conductive layers of a gold alloy having a resistivity of less than 22 $\mu\Omega$·cm and a hardness as high as or higher than a hardness of a material used for making the bias field applying layers, wherein each of the conductive layers is located to overlap one of the surfaces of the magnetoresistive element and is in contact with the magnetoresistive element only at the one of the surfaces of the magnetoresistive element, and each of the conductive layers has a sheet resistivity equal to or less than one-eighth of a sheet resistivity of the magnetoresistive element.

5. A method according to claim 4, wherein the sheet resistivity of each of the conductive layers is 2 Ω/square or less.

6. A method according to claim 4, wherein the gold alloy contains one of nickel and copper as an additive to gold.

7. A thin-film magnetic head comprising:

a medium facing surface that faces toward a recording medium;

a magnetoresistive element having an end located in the medium facing surface; and two conductive layers that feed a current used for magnetic signal detection to the magnetoresistive element, each of the conductive layers having an end located in the medium facing surface, wherein the conductive layers are each made of a gold alloy having a resistivity of less than 22 $\mu\Omega$·cm and a hardness higher than that of gold, each of the conductive layers is located to overlap one of the surfaces of the magnetoresistive element and is in contact with the magnetoresistive element only at the one of the surfaces of the magnetoresistive element, and each of the conductive layers has a sheet resistivity equal to or less than one-eighth of a sheet resistivity of the magnetoresistive element.

8. A method of manufacturing a thin-film magnetic head comprising: a medium facing surface that faces toward a recording medium; a magnetoresistive element having an end located in the medium facing surface; and two conductive layers that feed a current used for magnetic signal detection to the magnetoresistive element, each of the conductive layers having an end located in the medium facing surface, the method comprising the steps of:

forming the magnetoresistive element; and forming the two conductive layers of a gold alloy having a resistivity of less than 22 $\mu\Omega$·cm and a hardness higher than that of gold, wherein each of the conductive layers is located to overlap one of the surfaces of the magnetoresistive element and is in contact with the magnetoresistive element only at the one of the surfaces of the magnetoresistive element, and each of the conductive layers has a sheet resistivity equal to or less than one-eighth of a sheet resistivity of the magnetoresistive element.

9. A head gimbal assembly comprising a slider that includes a thin-film magnetic head and is located to face toward a recording medium, and a suspension that flexibly supports the slider, the thin-film magnetic head comprising:

a medium facing surface that faces toward a recording medium;

a magnetoresistive element having two surfaces that face toward opposite directions, two side portions, and an end located in the medium facing surface;

two bias field applying layers that are adjacent to the side portions of the magnetoresistive element and apply a bias magnetic field to the magnetoresistive element; and two conductive layers that feed a current used for magnetic signal detection to the magnetoresistive element, each of the conductive layers being adjacent to one of surfaces of each of the bias field applying layers and having an end located in the medium facing surface, wherein the conductive layers are each made of a gold alloy having a resistivity of less than 22 $\mu\Omega$·cm and a hardness as high as or higher than a hardness of a material used for making the bias field applying layers, each of the conductive layers is located to overlap one of the surfaces of the magnetoresistive element and is in contact with the magnetoresistive element only at the one of the surfaces of the magnetoresistive element, and each of the conductive layers has a sheet resistivity equal to or less than one-eighth of a sheet resistivity of the magnetoresistive element.

10. A hard disk drive comprising a slider that includes a thin-film magnetic head and is located to face toward a circular-plate-shaped recording medium that is rotated and driven, and an alignment device that supports the slider and aligns the slider with respect to the recording medium, the thin-film magnetic head comprising:

a medium facing surface that faces toward a recording medium;

a magnetoresistive element having two surfaces that face toward opposite directions, two side portions, and an end located in the medium facing surface;

two bias field applying layers that are adjacent to the side portions of the magnetoresistive element and apply a bias magnetic field to the magnetoresistive element; and two conductive layers that feed a current used for magnetic signal detection to the magnetoresistive element, each of the conductive layers being adjacent to one of surfaces of each of the bias field applying layers and having an end located in the medium facing surface, wherein the conductive layers are each made of a gold alloy having a resistivity of less than 22 $\mu\Omega\cdot$cm and a hardness as high as or higher than a hardness of a material used for making the bias field applying layers, each of the conductive layers is located to overlap one of the surfaces of the magnetoresistive element and is in contact with the magnetoresistive element only at the one of the surfaces of the magnetoresistive element, and each of the conductive layers has a sheet resistivity equal to or less than one-eighth of a sheet resistivity of the magnetoresistive element.

* * * * *